United States Patent
Agarwal et al.

(10) Patent No.: US 12,430,674 B2
(45) Date of Patent: Sep. 30, 2025

(54) SYSTEM AND METHOD FOR IMPLEMENTING INTELLIGENT INTERACTIONS IN A METAVERSE

(71) Applicant: Bank of America Corporation, Charlotte, NC (US)

(72) Inventors: Ankit Chandra Agarwal, Gurugram (IN); Srilaxmi Sreepalli, Hyderabad (IN); Sujatha Balaji, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 317 days.

(21) Appl. No.: 18/171,623

(22) Filed: Feb. 20, 2023

(65) Prior Publication Data
US 2024/0281858 A1    Aug. 22, 2024

(51) Int. Cl.
*G06Q 20/00* (2012.01)
*G06Q 30/0601* (2023.01)

(52) U.S. Cl.
CPC ............................... *G06Q 30/0611* (2013.01)

(58) Field of Classification Search
CPC ........... G06Q 30/0611; G06Q 30/0629; G06Q 30/0601–0645; G06Q 30/08
USPC ...... 705/26.1–27.2, 16, 21, 59; 380/44, 262, 380/278
See application file for complete search history.

(56) References Cited

U.S. PATENT DOCUMENTS

| | | | |
|---|---|---|---|
| 6,963,920 B1 | 11/2005 | Hohmann et al. | |
| 8,706,599 B1 | 4/2014 | Koenig et al. | |
| 9,626,210 B2 | 4/2017 | Phillips et al. | |
| 9,744,671 B2 | 8/2017 | Connell, II et al. | |
| 10,127,610 B1 | 11/2018 | Cassidy et al. | |
| 11,068,618 B2 | 7/2021 | Brannon et al. | |
| 11,157,685 B2 | 10/2021 | Herold | |
| 11,164,251 B1 | 11/2021 | Skala et al. | |
| 2008/0114700 A1 | 5/2008 | Moore et al. | |
| 2008/0119162 A1 | 5/2008 | Sivalingam et al. | |
| 2009/0018970 A1 | 1/2009 | Barkman, Jr. | |
| 2010/0211494 A1 | 8/2010 | Clements | |
| 2016/0057101 A1 | 2/2016 | Hugard, IV et al. | |
| 2018/0144400 A1 | 5/2018 | O'Brien et al. | |

(Continued)

OTHER PUBLICATIONS

Binary News Network; "Credit Metaverse Launches First WAX Blockchain Loan Service Using NFTs As Collateral;" https://www.digitaljournal.com/pr/credit-metaverse-launches-first-wax-blockchain-loan-service-using-nfts-as-collateral; Published Jun. 15, 2022.

*Primary Examiner* — Dante Ravetti (57) ABSTRACT

A system for implementing intelligent interactions in a metaverse comprises a metaverse server in communication with an entity server. A metaverse server receives an interaction request for an interaction session from a first user avatar to obtain a digital item in a virtual environment. The metaverse server determines an item value of the digital item is greater than the first asset value, determines a supplement asset required for the first user to obtain the digital item, and sends an asset request with the supplement asset to an entity avatar. The entity server determines that the supplement asset in a first asset pool in a database. The entity server generates digital contracts to receive the supplement asset and send the supplement asset to the metaverse server. The metaverse server completes the interaction session with the first asset and the supplement asset to obtain the digital item for the first user avatar.

20 Claims, 5 Drawing Sheets

(56) References Cited

U.S. PATENT DOCUMENTS

| | | |
|---|---|---|
| 2019/0251577 A1 | 8/2019 | Tonnison et al. |
| 2020/0042699 A1 | 2/2020 | Chari et al. |
| 2020/0151756 A1 | 5/2020 | Thrasher et al. |
| 2020/0265329 A1 | 8/2020 | Thomsen et al. |
| 2022/0343009 A1 | 10/2022 | Harb |
| 2023/0319373 A1* | 10/2023 | Yallen ............... H04N 21/84 713/176 |

* cited by examiner

SYSTEM AND METHOD FOR IMPLEMENTING INTELLIGENT INTERACTIONS IN A METAVERSE

TECHNICAL FIELD

The present disclosure relates generally to network communications and information security, and more specifically to a system and method for implementing intelligent interactions in a metaverse.

BACKGROUND

A user may operate a user device associated with an avatar to send an interaction request for a digital item associated with an item asset in a virtual environment, such as the metaverse. The digital item may represent a physical product or logical asset. In some instances, the interaction request may be declined due to a lack of sufficient assets possessed by the avatar associated with the user. Current technology does not provide a reliable and effective solution to obtain the digital item for the avatar when it does not possess sufficient assets in the metaverse.

SUMMARY

Conventional technology is not configured to provide reliable and efficient solutions to facilitate a user to implement intelligent interactions to receive a supplement asset to obtain a digital item in a virtual environment (e.g., such as a metaverse). The disclosed system described in the present disclosure is particularly integrated into a practical application to facilitate a user to implement intelligent interactions to receive a supplement asset to obtain a digital item in a virtual environment. The disclosed system is further integrated into an additional practical application of creating multiple asset pools to implement intelligent interactions to receive a supplement asset to obtain a digital item in the virtual environment.

The disclosed system is configured to implement intelligent interactions to facilitate a user with a user device (e.g., augmented reality (AR)/virtual reality (VR) headset) to receive a supplement asset to obtain a digital item in a virtual environment. In some embodiments, a metaverse server receives an interaction request from a first user avatar associated with a first user device of a first user for obtaining the digital item in the virtual environment. The metaverse server may determine a supplement asset required for the first user avatar to obtain the digital item with a user asset. The metaverse server may send an asset request with data of the supplement asset to an entity avatar associated with an entity server to obtain the supplement asset. The entity server may query an asset pool stored in a database to determine that a second asset associated with a second user matches the supplement asset. The entity server may generate and execute smart contracts for receiving the supplement asset from the second user. The entity server may generate and execute smart contracts for sending the supplement asset to the first user avatar through the metaverse server. The metaverse server may complete an interaction session with a combination of the first asset and the supplement asset to obtain the digital item for the first user avatar in the virtual environment. In some embodiments, the disclosed system may create the multiple asset pools associated with multiple entities. The disclosed system may receive user enrollment requests with corresponding user assets to enroll in the multiple asset pools. The disclosed system may obtain the supplement asset corresponding to a user asset in an asset pool to facilitate the first user to obtain the digital item in the virtual environment.

In one embodiment, the system for implementing intelligent interactions to complete an interaction session to obtain a digital item in the virtual environment comprises a metaverse server in communication with an entity server. A metaverse server receives an interaction request for an interaction session from a first user avatar to obtain a digital item associated with an item provider in a virtual environment. The metaverse server stores in a memory a first asset associated with a first user, the first asset comprising a first asset value with a first asset type. The digital item comprises an item value with the first asset type. The first user avatar is associated with a first user device associated with the first user. The metaverse server determines whether the item value is greater than the first asset value. In response to determining that the item value is greater than the first asset value, the metaverse server determines a supplement asset required for the first user to obtain the digital item, wherein the supplement asset represents a difference between the item value and the first asset value with the first asset type. The metaverse server sends an asset request initiated by the first user avatar to an entity avatar.

The entity avatar is associated with the entity server associated with an entity. The asset request includes data of the supplement asset comprising the supplement value with the first asset type. An entity server queries based on the asset request a database to determine whether the supplement asset matches a second asset associated with a second user in an asset pool. The database stores the asset pool with one or more assets registered with the entity. In response to determining that the supplement asset matches the second asset, the entity server generates a first digital contract between the entity and the second user for receiving the second asset corresponding to the supplement asset from the second user. The entity server generates a second digital contract between the entity and the first user for communicating the supplement asset to the first user. The entity server receives the second asset corresponding to the supplement asset based on the first digital contract from the second user. The entity server sends the supplement asset to the metaverse server based on the second digital contract. The metaverse server receives the supplement asset from the entity avatar associated with the entity server. The metaverse server communicates the supplement asset received from the entity avatar to the first user avatar. The metaverse server completes the interaction session with a combination of the first asset and the supplement asset to obtain the digital item for the user avatar.

In one embodiment, the system for creating multiple asset pools to complete an interaction session to obtain a digital item in a virtual environment comprises a metaverse server in communication with an entity server. A metaverse server receives an interaction request for an interaction session from a first user avatar to obtain a digital item associated with an item provider in a virtual environment. The digital item is associated with an item value with the first asset type. The first user avatar is associated with a first user device associated with a first user. The metaverse server determines whether the item value is greater than the first asset value. In response to determining that the item value is greater than the first asset value, the metaverse server determines a supplement asset required for the first user to obtain the digital item. The supplement asset represents a difference between the item value and the first asset value with the first asset type. The metaverse server sends an asset request initiated by the first user avatar to a first entity avatar. The first entity avatar is associated with the first entity server associated with the first entity. The asset request includes data of the supplement asset comprising the supplement value with the first asset type. The metaverse server receives an enrollment request from a second user avatar with a second asset to interact with at least the first entity avatar in a virtual environment.

The second user avatar is associated with a second user. The second asset comprises a second asset value, a second asset type and a geographical region. The metaverse server determines whether the second asset type and a geographical region of the second asset match a first entity profile of the first entity. The first entity profile includes one or more asset types and an entity geographical region wherein the first entity is located. In response to determining that the second asset type and the geographical region of the second asset match the first entity profile, the metaverse server approves the second user avatar to enroll with the second asset in a first asset pool associated with the first entity. The metaverse server stores the second asset in the first asset pool associated with the first entity in a database. The first entity server queries based on the asset request the database to determine whether the supplement asset matches a second asset associated with a second user in the asset pool. In response to determining that the supplement value with the first asset type matches the second asset associated with the second user in the asset pool, the first entity server sends the supplement value with the first asset type from a second user to the metaverse server. The metaverse server receives the supplement asset from the entity avatar associated with the entity server. The metaverse server communicates the supplement asset received from the entity avatar to the first user avatar. The metaverse server completes the interaction session with a combination of the first asset and the supplement asset for the user avatar to obtain the digital item.

The system described in the present disclosure provides practical applications with technical solutions to create multiple asset pools associated with corresponding entities and user assets to determine a supplement asset from an asset pool. The entity server queries an asset pool associated with an entity to determine a second asset associated with a second user which matches the supplement asset. The disclosed system provides the practical applications to generate digital contracts for receiving the supplement asset from the second user from the asset pool and sending the supplement asset to the first user. The disclosed system provides the practical applications to facilitate the first user avatar to obtain the digital item with a combination of a first asset of the first user and the supplement asset from the second user in the virtual environment. In this way, the interaction request to obtain the digital item may not be declined due to lack of a sufficient asset from the first user. Further, the disclosed system leads to a technical advantage of creating multiple asset pools to obtain the supplement asset for the first user avatar associated with the first user in the virtual environment.

The practical application, in turn, improves the performance and underlying operation of the disclosed system and reduces networking resources and data transmission in the network. The practical application reduces usage of network bandwidth necessitated by repeated interaction requests from computing devices and further alleviates network bottlenecks. In this way, the practical application provides a reliable and effective solution to obtain a digital item for the user in the virtual environment. Thus, the disclosed system provides a seamless interaction session with more efficient interactions while preventing declined requests and saving interaction processing time. The disclosed system provides faster and intelligent interactions to implement the interaction session to obtain the digital item for the user in the virtual environment.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Previous technologies fail to provide efficient and reliable solutions to facilitate a user to obtain a digital item in a virtual environment. This disclosure presents a system for creating multiple asset pools and completing an interaction session to receive a supplement asset to obtain a digital item in a virtual environment by referring to FIGS. 1, 3 through 4A-4B.

System Overview

Figure 1:
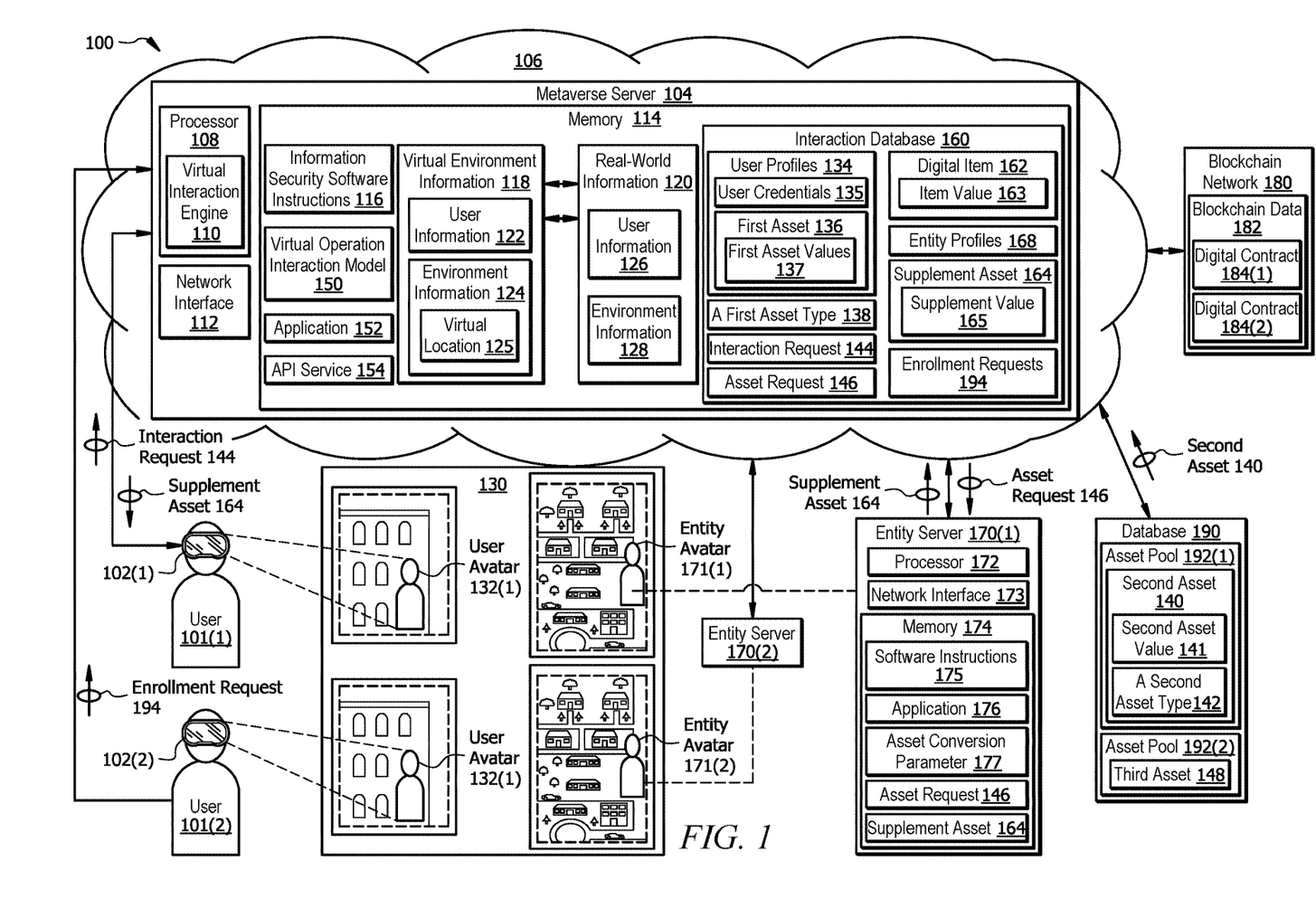
FIG. 1 illustrates an embodiment of a system configured to create multiple asset pools and complete an interaction session to obtain a digital item in a virtual environment.

FIG. 1 illustrates one embodiment of a system 100 that is configured to create multiple asset pools and complete an interaction session to receive a supplement asset to obtain a digital item 162 in the virtual environment 130. In one embodiment, system 100 comprises a metaverse server 104, one or more user devices 102, one or more entity servers 170, a blockchain network 180, a database 190, and a network 106. Network 106 enables the communication between components of the system 100. Metaverse server 104 comprises a processor 108 in signal communication with a memory 114. Memory 114 stores information security software instructions 116 that when executed by the metaverse server 104, cause the metaverse server 104 to execute one or more functions described herein. Entity server 170 comprises a processor 172 in signal communication with a memory 174. Memory 174 stores software instructions 175 that when executed by the processor 172, cause the processor 172 to execute one or more functions described herein. The blockchain network 180 is a public blockchain network which may be referred to a distributed database shared by a plurality of computing devices in the network 106. The system 100 transmits data between metaverse server 104, one or more user devices 102, one or more entity servers 170, the blockchain network 180, and/or the database 190 through the network 106. The database 190 may include asset pools 192 associated with a plurality of entities.

In some embodiments, the system 100 may be implemented by a metaverse server 104 in communication with an entity server 170 to receive a supplement asset 164 to obtain a digital item 162 for a first user 101[1] in the virtual environment 130. For example, the metaverse server 104 may receive an interaction request 144 from a first user avatar 132[1] for an interaction session to obtain a digital item 162 in the virtual environment 130. The first user avatar 132[1] is associated with a first user device 102[1] of the first user 101[1]. The metaverse server 104 may determine a supplement asset 164 required for the first user avatar 132[1] to obtain the digital item 162 with a first asset 136 of a first user 101[1]. The metaverse server 104 may send an asset request 146 initiated by the first user avatar 132[1] to a first entity avatar 171[1] to obtain the supplement asset 164. The first entity server 170[1] associated with a first entity may query a database 190 to determine a second asset 140 corresponding to the supplement asset 164 which matches a second asset 140 stored in an asset pool 192 in a database 190. Further, the metaverse server 104 may receive the supplement asset 164 from the first entity avatar 171[1]. The first entity server 170[1] generates a first digital contract 184[1] between the first entity and the second user 101[2] for receiving the second asset 140 corresponding to the supplement asset 164 from the second user 101[2]. The first entity server 170[1] generates a second digital contract 184[2] between the first entity and the first user 101[1] for sending the supplement asset 164 to the first user avatar 132[1] through the metaverse server 104. The supplement asset 164 corresponds to the second asset 140 associated with the second user 101[2]. The metaverse server 104 may complete the interaction session with a combination of the first asset 136 and the supplement asset 164 for the first user avatar 132[1] to obtain the digital item 162 in the virtual environment 130.

In some embodiments, the system 100 may be implemented by a metaverse server 104 in communication with one or more entity servers 170 to create multiple asset pools 192 associated with corresponding entities to obtain a digital item 162 for a first user 101[1] in the virtual environment 130. The metaverse server 104 receives an enrollment request 194 from a second user avatar 132[2] with a second asset 140 to interact with at least a first entity avatar 171[1] in the virtual environment 130. A second user avatar 132[2] is associated with a second user. The second asset 140 comprises a second asset value 141, a second asset type 142 and a geographical region. The entity server 170 associated with the first entity avatar 171[1] may determine whether to approve the second user avatar 132[2] to enroll with the second asset 140 in a first asset pool 192[1] associated with the first entity. For example, the entity server 170 may determine whether the second asset type 142 satisfies one of the asset types required by the first entity. In response to determining that the second asset type 142 satisfies one of the asset types required by the first entity, the entity server 170 may send an approval via the entity avatar 171 to the second user avatar 132[2] to enroll the second user 101[2] with the second asset 140 into the first asset pool 192[1] associated with the first entity. The entity server 170 may store the second asset 140 in the first asset pool 192[1] in a database 190.

System Components

Network

The network 106 may include any interconnecting system capable of transmitting audio, video, signals, data, messages, or any combination of the preceding. The network 106 may include all or a portion of a local area network, a metropolitan area network, a wide area network, an overlay network, a software-defined network a virtual private network, a packet data network (e.g., the Internet), a mobile telephone network (e.g., cellular networks, such as 4G or 5G), a Plain Old Telephone network, a wireless data network (e.g., Wi-Fi, WiGig, WiMax, etc.), a Long Term Evolution network, a Universal Mobile Telecommunications System network, a peer-to-peer network, a Bluetooth network, a Near Field Communication network, a Zigbee network, and/or any other suitable network. The network 106 may be configured to support any suitable type of communication protocol as would be appreciated by one of ordinary skill in the art.

User Devices

A user device 102 is a hardware device that is generally configured to provide hardware and software resources to a user. Examples of a user device 102 include, but are not limited to, a virtual reality (VR) device, an augmented reality (AR) device, a laptop, a computer, a smartphone, a tablet, a smart device, an Internet-of-Things (IoT) device, or any other suitable type of device. The user device 102 may comprise a graphical user interface (e.g., a display), a touchscreen, a touchpad, keys, buttons, a mouse, or any other suitable type of hardware that allows a user to view data and/or to provide inputs into the user device 102.

Each user device 102 is configured to display a two-dimensional (2D) or three-dimensional (3D) representation of a virtual environment 130 to a user. Within the virtual environment 130, each user may be associated with a user device 102 and an avatar 132. An avatar 132 is a graphical representation of the user device 102 associated with the user and the user profile 134 within the virtual environment 130. Examples of the avatars 132 include, but are not limited to, a person, an animal, or an object. In some embodiments, the features and characteristics of the avatar 132 may be customizable and user defined. By using the avatar 132, a user or the user device 102 can move within the virtual environment 130 to interact with an entity associated with the metaverse server 104 or other avatars and objects within the virtual environment 130.

Figure 2:
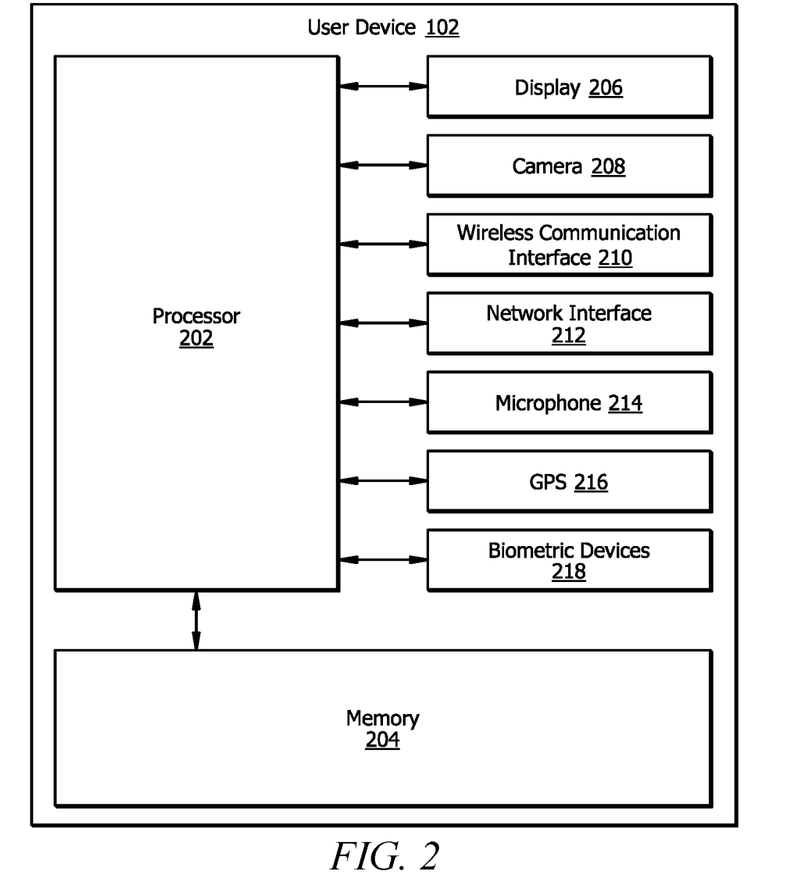
FIG. 2 is a block diagram of an example user device of the system of FIG. 1.

FIG. 2 is a block diagram of an embodiment of the user device 102 used by the system of FIG. 1. The user device 102 may be configured to display the virtual environment 130 (referring to FIG. 1) within a field of view of the user (referring to FIG. 1), capture biometric, sensory, and/or physical information of the user wearing and operating the user device 102, and to facilitate an electronic interaction between the user and the metaverse server 104. The user device 102 comprises a processor 202, a memory 204, and a display 206. The processor 202 comprises one or more processors operably coupled to and in signal communication with memory 204, display 206, camera 208, wireless communication interface 210, network interface 212, microphone 214, GPS sensor 216, and biometric devices 218. The one or more processors is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1, 3 and 4A-4B. For example, processor 202 may be configured to display virtual objects on display 206, detect user location, identify virtual sub, capture biometric information of a user, via one or more camera 208, microphone 214, and/or biometric devices 218, and communicate via wireless communication interface 210 with a metaverse server 104, an entity server 170, and/or other user devices 102.

Memory 204 is operable to store any of the information described with respect to FIGS. 1, 3 and 4A-4B along with any other data, instructions, logic, rules, or code operable to implement the function(s) described herein when executed by processor 202. The memory 204 comprises one or more disks, tape drives, or solid-state drives, and may be used as an over-flow data storage device, to store programs when such programs are selected for execution, and to store instructions and data that are read during program execution. In some embodiments, the memory 204 may store and/or include a browser or web application for a user device 102 to interact with the entity, such as, for example, to access application services (e.g., application 152) provided by the metaverse server 104 in the virtual environment 130.

Display 206 is configured to present visual information to a user (for example, user in FIG. 1) in an augmented reality environment that overlays virtual or graphical objects onto tangible objects in a real scene in real-time. In other embodiments, the display 206 is configured to present visual information to the user as the virtual environment 130 (referring to FIG. 1) in real-time. In an embodiment, display 206 is a wearable optical display (e.g., glasses or a headset) configured to reflect projected images and enables a user to see through the display 206. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), or any other suitable type of display as would be appreciated by one of ordinary skill in the art upon viewing this disclosure. In another embodiment, display 206 is a graphical display on a user device 102. For example, the graphical display may be the display of a tablet or smart phone configured to display an augmented reality environment with virtual or graphical objects overlaid onto tangible objects in a real scene in real-time environment and/or virtual environment 130.

Camera 208 is configured to capture images of a wearer of the user device 102. For example, camera 208 may be configured to receive a command from the user to capture images and form a video stream. Wireless communication interface 210 is configured to facilitate processor 202 in communicating with other devices. Wireless communication interface 210 is configured to employ any suitable communication protocol. Network interface 212 may be configured to use any suitable type of communication protocol and enable wired and/or wireless communications. Microphone 214 is configured to capture audio signals (e.g., voice signals or commands) from a user 101. GPS sensor 216 is configured to capture and to provide geographical location information. For example, GPS sensor 216 is configured to provide a geographic location of a user device 102 associated with a user 101. Biometric devices 218 are configured to capture information about a person's physical characteristics and to output a biometric signal based on captured information. Examples of biometric devices 218 may include, but are not limited to, retina scanners and fingerprint scanners.

Metaverse Server

Referring to FIG. 1, the metaverse server 104 is a hardware device that is generally configured to provide services and software and/or hardware resources to user devices 102. The metaverse server 104 is generally a server, or any other device configured to process data and communicate with entity servers 170 and user devices 102 via the network 106. The metaverse server 104 is generally configured to oversee the operations of a virtual interaction engine 110, as described further below in conjunction with the operational flows of methods 300 and 400 described in FIGS. 3 and 4A-4B. In some embodiments, the metaverse server 104 may be implemented in the cloud or may be organized in either a centralized or distributed manner.

The processor 108 is a hardware device that comprises one or more processors operably coupled to the memory 114. The processor 108 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The processor 108 is communicatively coupled to and in signal communication with the memory 114 and the network interface 112. The one or more processors are configured to process data and may be implemented in hardware or software. For example, the processor 108 may be 8-bit, 16-bit, 32-bit, 64-bit, or of any other suitable architecture. The processor 108 may include an arithmetic logic unit (ALU) for performing arithmetic and logic operations, processor registers that supply operands to the ALU and store the results of ALU operations, and a control unit that fetches instructions from the memory 114 and executes them by directing the coordinated operations of the ALU, registers and other components. The processor 108 may be a special-purpose computer designed to implement the functions disclosed herein.

In an embodiment, the virtual interaction engine 110 is implemented using logic units, FPGAs, ASICs, DSPs, or any other suitable hardware. The virtual interaction engine 110 may be configured to perform operations of the method 300 as described in FIGS. 3 and 4A-4B. For example, the virtual interaction engine 110 may be configured to facilitate the avatar 132 to conduct interactions with an entity within a virtual environment 130.

The memory 114 stores any of the information described above with respect to FIGS. 1, 3 and 4A-4B along with any other data, instructions, logic, rules, or code operable to implement the function(s) described herein when executed by the processor 108. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store information security software instructions 116 which may comprise any suitable set of instructions, logic, rules, or code operable to execute the virtual interaction engine 110. Virtual interaction engine 110 may include, but is not limited to, one or more separate and independent software and/or hardware components of a metaverse server 104. In an example operation, the memory 114 may store a virtual operation interaction model 150, an application 152, an application programming interface (API) service 154, and other program models which executed by the processor 108 to implement operational flows of the system of FIG. 1. The application 152 may be a metaverse application associated with an entity that provides application services to avatars 132 associated with a user 101 and a user device 102 in a virtual environment 130.

Database 160 (e.g., interaction database 160) may be a remote database, a cloud database, or an on-site internal database. Database 160 may be coupled to or in communication with and accessed by the metaverse server 104 via the network 106. As illustrated in FIG. 1, the database 160 is an internal database and stores information including user profiles 134, user credentials 135, a first asset 136, interaction requests 144, asset requests 146, digital item 162, entity profiles 168, enrollment requests 194.

A user profile 134 may include a user credential 135. The user credential 135 associated with a user is registered with the entity in the real-world environment and used by the user to interact with the metaverse server 104 and entity servers 170. A user profile 134 further includes a physical address, email address, phone number, and any other data, such as documents, files, media items, etc. The plurality of user profiles 134 may be stored by the processor 108 in the memory 114.

The virtual environment information 118 comprises user information 122 and environment information 124. The user information 122 generally comprises information that is associated with any user profiles 134 associated with user accounts that can be used within a virtual environment 130. The environment information 124 includes data of a virtual environment 130 corresponding to one or more virtual locations 125. For example, user information 122 may comprise user profile information, online account information, digital assets information, or any other suitable type of information that is associated with a user 101 within a virtual environment 130. The environment information 124 generally comprises information about the appearance of a virtual environment 130. For example, the environment information 124 may comprise information associated with objects, landmarks, buildings, structures, avatars 132, virtual environment 130, or any other suitable type of element that is present within a virtual environment 130. In some embodiments, the environment information 124 may be used to create a representation of a virtual environment 130 for users 101. In this case, a virtual environment 130 may be implemented using any suitable type of software framework or engine.

Examples of a virtual environment 130 include, but are not limited to, a graphical or virtual representation of a metaverse, a map, a city, a building interior, a landscape, a fictional location, an alternate reality, or any other suitable type of location or environment. A virtual environment 130 may be configured to use realistic or non-realistic physics for the motion of objects within the virtual environment 130.

The real-world information 120 comprises user information 126 and environment information 128. The user information 126 generally comprises information that is associated with user profiles 134 and user accounts that can be used within the real world. For example, user information 126 may comprise user profile information, account information, or any other suitable type of information that is associated with a user within a real-world environment. The environment information 128 generally comprises information that is associated with an entity within the real world that the user is a member of or is associated with. For example, the environment information 128 may comprise physical addresses, GPS based locations, phone numbers, email addresses, contact names, or any other suitable type of information that is associated with an entity. Since the metaverse server 104 has access to both the virtual environment information 118 and the real-world information 120, the metaverse server 104 may link the virtual environment information 118 and the real-world information 120 together for a user 101 such that changes to the virtual environment information 118 affect or propagate to the real-world information 120 of the real-world environment and vice-versa. The metaverse server 104 may be configured to store one or more maps that translate or convert different types of interactions between the real-world environment and the virtual environment 130 and vice-versa.

The metaverse server 104 may generate a virtual environment 130 based on the virtual environment information 118 and the real-world information 120 of the real-world environment. In some embodiments, the virtual environment 130 may be a metaverse branch of the entity. In one embodiment, the virtual environment 130 represents an entity at different physical geographic locations in the real-world environment. The metaverse server 104 may be configured to store one or more maps executed by the processor 108 that translate or convert different types of interactions occurred in and between the virtual environment 130 and the real-world environment.

Within the virtual environment 130, an avatar 132 is generated by the processor 108 as a graphical representation of a user device 102 within the virtual environment 130. The avatar 132 includes a plurality of features and characteristics which are processed by the processor 108 to present the avatar 132 as the graphical representation of a user device 102 in the virtual environment 130. For example, the metaverse server 104 may receive a signal indicating a physical geographic location of the user device 102 and/or detect the user device 102 in the real-world environment. The metaverse server 104 may store the received signal in the memory 114. The metaverse server 104 may determine a virtual location 125 of the avatar 132 associated with the user device 102 in the virtual environment 130 based on the physical geographic location of the user device 102. The metaverse server 104 may obtain the environment information 124 and environment information 128 associated with the virtual location 125 and the physical geographic location of the user device 102 in the real-world environment. The metaverse server 104 may generate and present an avatar 132 in the virtual environment 130 based on the obtained environment information 124 and environment information 128. By using the user device 102, the avatar 132 can move or maneuver and interact with entities, other avatars, and objects within the virtual environment 130.

Network interface 112 is a hardware device that is configured to enable wired and/or wireless communications.

The network interface 112 is configured to communicate data between user devices 102 and other devices, systems, or domains. For example, the network interface 112 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 108 is configured to send and receive data using the network interface 112. The network interface 112 may be configured to use any suitable type of communication protocol as would be appreciated by one of ordinary skill in the art.

Entity Server

Referring to FIG. 1, an entity server 170 is generally a server, or any other device configured to provide services and software and/or hardware resources to the metaverse server 104 and user devices 102, etc., via the network 106. The entity server 170 includes a memory 174 and a processor 172 operably coupled to the memory 174. The entity server 170 is configured to process data and communicate with the metaverse server 104 and user devices 102 via the network 106. The entity server 170 is generally configured to perform the operations as described further below in conjunction with the operations as described in FIGS. 3 and 4A-4B. The memory 174 stores any of the information described above with respect to FIGS. 1, 3 and 4A-4B along with any other data, instructions, logic, rules, or code operable to implement the function(s) described herein when executed by the processor 172.

The memory 174 is operable to store software instructions 175 which may comprise any suitable set of instructions, logic, rules, or code operable to execute operations as described further below in conjunction with the operations as described in FIGS. 3 and 4A-4B. In an example operation, the memory 174 may store an application 176, and other program models which executed by the processor 172 to implement operational flows of the system of FIGS. 1, 3 and 4A-4B. The application 176 may be an application associated with an entity that provides application services to user devices 102 associated with users 101 in a real-world environment. The memory 174 may be operable to store asset request 146, supplement asset 164, and asset conversion parameter 177, etc.

The entity server 170 may include a network interface 173 which is configured to enable wired and/or wireless communications (e.g., via network 106). The network interface 173 may be configured to communicate data among the entity server 170, the metaverse server 104, the user devices 102, databases, systems, or domains. For example, the network interface 173 may comprise a WIFI interface, a local area network (LAN) interface, a wide area network (WAN) interface, a modem, a switch, or a router. The processor 172 is configured to send and receive data using the network interface 173. The network interface 173 may be configured to use any suitable type of communication protocol as would be appreciated by one of ordinary skill in the art.

Virtual Operation Engine

In some embodiments, the virtual interaction engine 110 may be implemented by the processor 108 by executing the information security software instructions 116 to create a virtual environment 130, detect user devices associated with users, and generate user avatars 132 associated with corresponding user devices 102 of a plurality of users 101 in the virtual environment 130. For example, the virtual interaction engine 110 may be implemented by the processor 108 to generate a first user avatar 132[1] associated with a first user device 102[1] of a first user 101[1] and generate a second user avatar 132[2] associated with a second user device 102[2] of a second user 101[2] in the virtual environment 130. The virtual interaction engine 110 may be implemented by the processor 108 to generate a first entity avatar 171[1] associated with a first entity server 170[1] in the virtual environment 130.

The virtual interaction engine 110 may be implemented by the processor 108 to execute a virtual operation interaction model 150 to receive an interaction request 144 from the first user avatar 132[1] for an interaction session to obtain a digital item 162 in the virtual environment 130. The virtual interaction engine 110 may be implemented by the processor 108 to determine a supplement asset 164 required for the first user avatar 132[1] to obtain the digital item 162 with the first asset 136 of the first user 101[1]. The virtual interaction engine 110 may be implemented by the processor 108 to send an asset request 146 initiated by a first user avatar 132[1] associated with a first user 101[1] to the first entity avatar 171[1] to obtain the supplement asset 164. The virtual interaction engine 110 may be implemented by the processor 108 to receive the supplement asset 164 corresponding to a second asset 140 associated with a second user 101[2]. Further, the virtual interaction engine 110 may be implemented by the processor 108 to complete the interaction session with a combination of the first asset 136 and the supplement asset 164 for the first user avatar 132[1] to obtain the digital item 162 in the virtual environment 130. The operation of the system 100 is described in FIGS. 3 and 4A-4B below.

Initiate an Interaction Session to Obtain a Digital Item in a Virtual Environment In some embodiments, the metaverse server 104 may receive an interaction request 144 for an interaction session from a first user avatar 132[1] to obtain a digital item 162 associated with an item provider. The digital item 162 may be provided by the item provider and include an item value 163 with the first asset type 138. The digital item 162 may represent a physical object or a logic object. The physical object may represent a physical product. The logic object may represent a software product or service. The memory 114 of the metaverse server 104 stores a user profile 134 which includes a first asset 136 associated with a first user 101[1]. The first asset 136 may include a first asset value 137 with a first asset type 138.

In response to receiving the interaction request 144, the metaverse server 104 may determine whether the item value 163 of the digital item 162 is greater than the first asset value 137 of the first asset 136. In one embodiment, the digital item 162 may have the same asset type as the first asset type 138 associated with the first asset 136 of the first user 101[1]. The metaverse server 104 may compare the item value 163 of the digital item 162 to the first asset value 137 to determine whether the item value 163 is greater than the first asset value 137. In one embodiment, the metaverse server 104 may determine that the item value 163 is not greater than the first asset value 137. The first user avatar 132[1] may request the metaverse server 104 to deduct an amount of the item value 163 from the first asset value 137 of the first asset 136 to the item provider. The metaverse server 104 may complete the interaction session with the amount of the item value 163 deducted from the first asset 136 for the user avatar 132 to obtain the digital item 162.

In one embodiment, when the metaverse server 104 determines that the item value 163 is greater than the first asset value 137, the metaverse server 104 may determine a supplement asset 164 which is required for the first user 101[1] to obtain the digital item 162. The supplement asset 164 includes the supplement value 165 with the first asset type 138. The supplement asset 164 represents a difference between the item value 163 and the first asset value 137 with the first asset type 138. The first user avatar 132[1] may initiate an asset request 146 to a first entity avatar 171 to obtain the supplement asset 164 from the first entity. The asset request 146 includes data of the supplement asset 164 which includes the supplement value 165 with the first asset type 138.

In one embodiment, the metaverse server 104 may determine the first user avatar 132[1] is associated with the first entity avatar 171[1]. For example, the first user device 102[1] of the first user 101[1] may be in the same geographical region where the first entity is located. The first user device 102[1] of the first user 101[1] may registered with the first entity with a user profile 134. The metaverse server 104 may send the asset request 146 to a first entity avatar 171[1] associated with the first entity server 170[1] of the first entity. The first entity server 170[1] may query the database 190 to obtain the supplement asset 164 from a first asset pool 192[1] associated with the first entity. The operations of the system 100 are described in FIGS. 3 and 4A-4B below.

Create Multiple Asset Pools for Enrolling User Assets With Different Entities

In some embodiments, the metaverse server 104 may be in communication with one or more entity servers 170 via a network 106. The memory 114 of the metaverse server 104 may store a plurality of entity profiles 168. Each entity profile 168 is associated with a corresponding entity. Each entity profile 168 includes one or more asset types and an entity geographical region where the entity is located or operates.

In some embodiments, the metaverse server 104 may receive an enrollment request 194 from a second user avatar 132[2] with a second asset 140 in the virtual environment 130. The enrollment request 194 may include data of the second asset 140 which includes a second asset value 141 and a second asset type 142. The second user avatar 132[2] is associated with a second user device 102[2] of a second user 101[2]. The second user avatar 132[2] may interact with at least a first entity avatar 171[1] in the virtual environment 130 for enrolling in a first asset pool 192[1] stored in a database 190. The second asset 140 may include a second asset value 141, a second asset type 142 and a geographical region where the second user 101[2] with the second user device 102[2] is located. The metaverse server 104 may determine whether the second asset type 142 and a geographical region of the second asset 140 match at least one asset type and a corresponding entity geographical region which are stored in a first entity profile 168[1] of the first entity. When the metaverse server 104 determines that the second asset type 142 and the geographical region of the second asset 140 of the second user 101[2] match the first entity profile 168[1], the metaverse server 104 may approve the second user avatar 132[2] to enroll with the second asset 140 in a first asset pool 192[1] associated with the first entity. The metaverse server 104 may store the second asset 140 in the first asset pool 192[1] associated with the first entity in a database 190.

In some embodiments, the metaverse server 104 may send the enrollment request 194 received from the second user avatar 132[2] to the first entity avatar 171[1]. The first entity server 170[1] associated with the first entity avatar 171[1] may determine whether to approve the second user avatar 132[2] to enroll with the second asset 140 in a first asset pool 192[1] associated with the first entity. For example, the entity server 170 may determine whether the second asset type 142 satisfies one of the asset types required by the first entity. In response to determining that the second asset type 142 satisfies one of the asset types required by the first entity, the first entity avatar 171[1] may send an approval to the second user avatar 132[2] to enroll the second user 101[2] with the second asset 140 into the first asset pool 192[1]. The entity server 170 may store the second asset 140 in the first asset pool 192[1] in a database 190.

In some embodiments, the metaverse server 104 may receive an additional enrollment request 194 from a third user avatar with a third asset 148. The metaverse server 104 may determine a third user associated with third user avatar is in a geographical area where a second entity is located. The second entity avatar 171[2] may be associated with a second entity server 170[2] associated with a second entity. The third asset 148 may include a third asset value, a third asset type and a geographical region. The metaverse server 104 may determine whether the third asset type and a geographical region of the third asset 148 match a second entity profile 168[2] of the second entity. The second entity profile 168[2] may include one or more asset types and an entity geographical region where the second entity is located or operates. When the metaverse server 104 determines that the third asset type and the geographical region of the third asset 148 match the corresponding data of the second entity profile 168[2], the metaverse server 104 may approve the third user avatar to enroll with the third asset 148 in a second asset pool 192[2] associated with the second entity. The metaverse server 104 may store the third asset 148 in the second asset pool 192[2] associated with the second entity in a database 190. The related operations of the system 100 are described in FIGS. 3 and 4A-4B below.

Obtain a User Asset Corresponding to a Supplement Asset From an Asset Pool

In some embodiments, a first entity server 170[1] may receive an asset request 146 with data of a supplement asset 164 from the metaverse server 104 through the first entity avatar 171[1]. The data of the supplement asset 164 may include the supplement value 165 with the first asset type 138. The first entity server 170[1] may obtain the supplement asset 164 from a first asset pool 192[1] associated with the first entity.

In some embodiment, the first entity server 170[1] may query the first asset pool 192[1] stored in the database 190 based on the data of the supplement asset 164. The first entity server 170[1] may determine whether the data of the supplement asset 164 matches a second asset 140 associated with a second user 101[2] in the first asset pool 192[1]. In one embodiment, the second asset 140 has a second asset value 141 with a second asset type 142. The first entity server 170[1] may determine whether the second asset type 142 of the second asset 140 is the same as the first asset type 138 associated with the supplement value 165. When the entity server 170 determines that the second asset type 142 is not the same as the first asset type 138 associated with the supplement value 165, The entity server 170 may convert the second asset value 141 with the second asset type 142 into a converted asset value with the first asset type 138 based on an asset conversion parameter 177. In some embodiments, an asset type of an asset or a digital asset may be associated with a fiat currency, a digital currency, a non-fungible token (NFT), or any type of currencies. The asset conversion parameter 177 may be a variable which is indicative of a relationship between two asset values with different asset types.

The first entity server 170[1] may determine whether the supplement value 165 matches the converted asset value with the first asset type 138. In response to determining a match, the first entity server 170[1] may proceed to generate corresponding smart contracts to obtain the second asset 140 from the second user 101[2]. The second asset 140 corresponds to the supplement value 165. The related operations are described in FIGS. 3 and 4A-4B below.

Generate and Execute Smart Contracts for Obtaining a Supplement Asset to Complete an Interaction Session to Obtain a Digital Item in a Real-World Environment In one embodiment, the first entity server 170[1] may determine that the supplement asset 164 matches the second asset 140 stored in the first asset pool 192[1] in the database 190. The first entity server 170[1] may generate a first digital contract 184[1] between the first entity and the second user 101[2] for receiving the second asset 140 from the second user 101[2]. The first entity server 170[1] may generate a second digital contract 184[2] between the first entity and the first user 101[1] for communicating the supplement asset 164 to the first user 101[1].

In some embodiments, the first entity server 170[1] may generate a blockchain data 182 associated with the second asset 140 based on the first digital contract 184[1] and the second digital contract 184[2]. The first entity server 170[1] may store data of the first digital contract 184[1] and the second digital contract 184[2] as the blockchain data 182 in a blockchain network 180. The first digital contract 184[1] may be executed by the first entity server 170[1] to receive the second asset 140 corresponding to the supplement asset 164 from the second user 101[2]. Further, the second digital contract 184[2] may be executed by the first entity server 170[1] to send the supplement asset 164 corresponding to the second asset 140 to the first user avatar 132[2] through the metaverse server 104.

In some embodiments, the first entity server 170[1] may update the blockchain data 182 based on one or more executions of the first digital contract 184[1] and the second digital contract 184[2]. In some embodiments, the metaverse server 104 may receive the supplement asset 164 from the first entity avatar 171[1] associated with the first entity server 170[1]. The metaverse server 104 may communicate the supplement asset 164 received from the first entity avatar 171[1] to the first user avatar 132[1]. The metaverse server 104 may combine the first asset value 137 with the first asset type 138 with the supplement value 165 for the first user avatar 132[1]. The metaverse server 104 may complete the interaction session with a combination of the first asset 136 and the supplement asset 164 for the first user avatar 132[1] to obtain the digital item 162. In one embodiment, the first user avatar 132[1] may request the metaverse server 104 to communicate the combination of the first asset 136 and the supplement asset 164 to the item provider to obtain the digital item 162. For example, the metaverse server 104 may complete the interaction session with a combination of the first asset value 137 and the supplement value 165 with the first asset type 138 for the first user avatar 132[1] to obtain the digital item 162. The related operations are described in FIGS. 3 and 4A-4B below.

Figure 3:
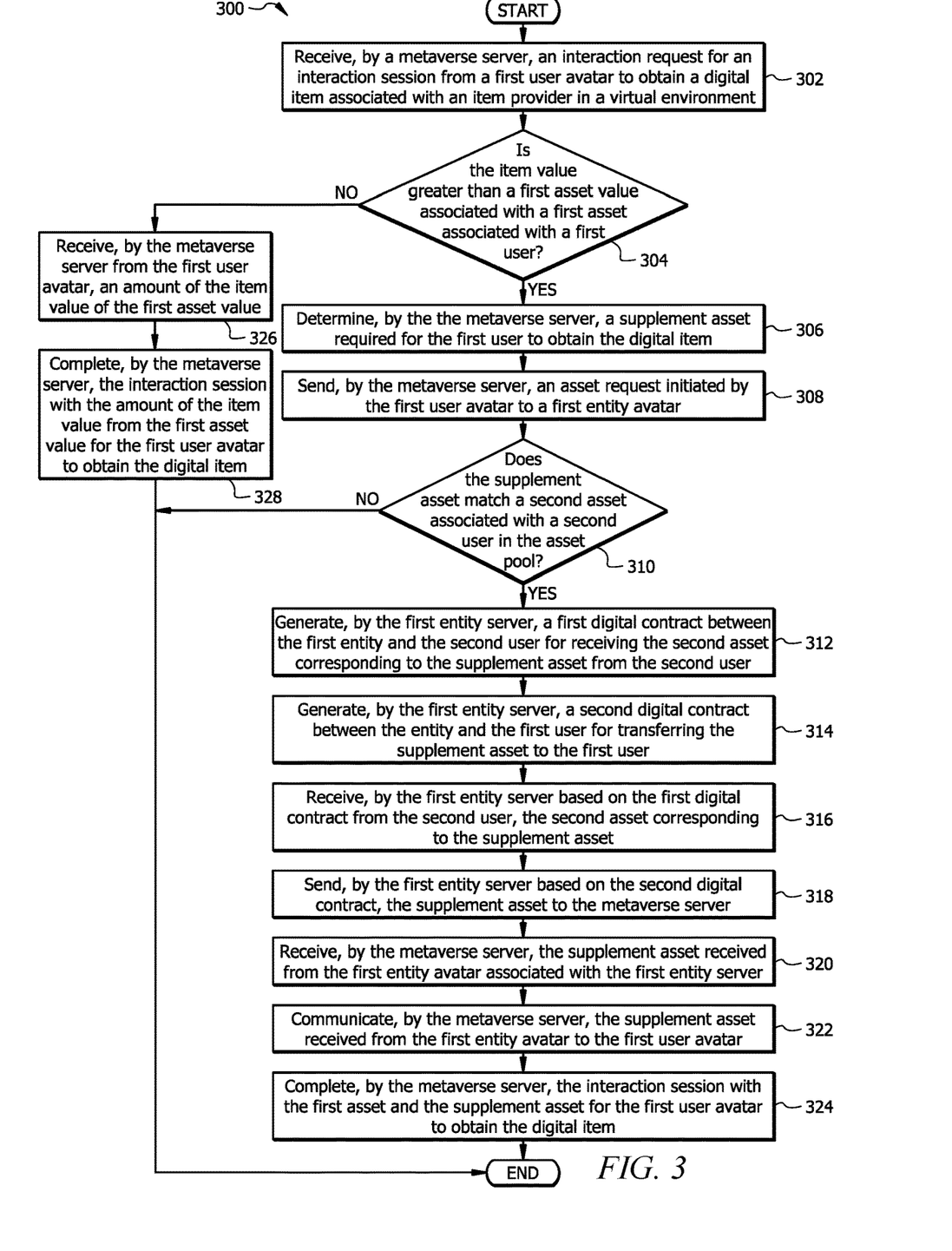
FIG. 3 illustrates an example operational flow of a method for implementing intelligent interactions to complete an interaction session to obtain a digital item in the virtual environment.

Example Operational Flow for Operations of Implementing Intelligent Interactions to Complete an Interaction Session to Obtain a Digital Item in the Virtual Environment FIG. 3 provides an example operational flow of a method 300 of implementing intelligent interactions to complete an interaction session to obtain a digital item 162 in the virtual environment 130. Modifications, additions, or omissions may be made to method 300. Method 300 may include more, fewer, or other operations may be performed by the metaverse server 104 and the first entity server 170[1] in parallel or in any suitable order. While at times discussed as the system 100, processor 108, processor 172, virtual interaction engine 110, information security software instructions 116, software instructions 175, or components of any of thereof performing operations, any suitable system or components of the system 100 may perform one or more operations of the method 300. For example, one or more operations of method 300 may be implemented, at least by metaverse server 104 and the entity server 170 to perform operations 302-328.

The method 300 begins at operation 302 where the metaverse server 104 identifies a first user avatar 132[1] associated with a first user device 102[1] and the first user 101[1] in the virtual environment 130. The metaverse server 104 may receive an interaction request 144 for an interaction session from a first user avatar 132[1] to obtain a digital item 162 associated with an item provider in a virtual environment 130. The digital item 162 includes an item value 163 with the first asset type 138. The metaverse server 104 stores in a memory 114 a first asset 136 associated with a first user 101[1]. The first asset 136 may include an asset value 137 with a first asset type 138.

At operation 304, the metaverse server 104 determines whether the item value 163 is greater than the first asset value 137. At operation 326, in response to determining that the item value 163 is not greater than the first asset value 137, the metaverse server 104 may receive an amount of the item value 163 which is deducted from the first asset value 137 of the first asset 136 associated with the first user 101[1]. For example, the first user avatar 132[1] may request the metaverse server 104 to deduct the amount of the item value 163 from the first asset value 137 of the first asset 136. At operation 328, the metaverse server 104 may complete the interaction session with the amount of the item value 163 from the first asset 136 for the user avatar 132 to obtain the digital item 162 in the virtual environment 130.

At operation 306, in response to determining that the item value 163 is greater than the first asset value 137, the metaverse server 104 determines a supplement asset 164 required for the first user 101[1] to obtain the digital item 162. The supplement asset 164 represents a difference between the item value 163 and the first asset value 137 with the first asset type 138.

At operation 308, the metaverse server 104 sends an asset request 146 initiated by the first user avatar 132[1] to a first entity avatar 171[1]. The first entity avatar 171[1] is associated with a first entity server 170[1] associated with a first entity. The asset request 146 includes the supplement asset 164 which includes the supplement value 165 with the first asset type 138. The first entity server 170[1] receives the asset request 146 with the supplement asset 164.

At operation 310, the first entity server 170[1] queries a database 190 based on the asset request 146 to determine whether the supplement asset 164 matches a second asset 140 associated with a second user in a first asset pool 192[1]. The database 190 stores the first asset pool [1] 192 with one or more assets registered with the entity.

At operation 312, in response to determining that the supplement asset 164 matches the second asset 140, the first entity server 170[1] generates a first digital contract 184[1] between the first entity and the second user for receiving the second asset 140 corresponding to the supplement asset 164 from the second user.

At operation 314, the first entity server 170[1] generates a second digital contract 184[2] between the first entity and the first user 101[1] for communicating the supplement asset 164 to the first user 101[1].

At operation 316, the first entity server 170[1] receives the second asset 140 corresponding to the supplement asset 164 based on the first digital contract 184[1] from the second user.

At operation 318, the first entity server 170[1] sends the supplement asset 164 to the metaverse server 104 based on the second digital contract 184[2].

At operation 320, the metaverse server 104 receives the supplement asset 164 from the first entity avatar 171 associated with the first entity server 170[1].

At operation 322, the metaverse server 104 communicates the supplement asset 164 received from the first entity avatar 171[1] to the first user avatar 132[1].

At operation 324, the metaverse server 104 completes the interaction session with a combination of the first asset 136 and the supplement asset 164 for the user avatar to obtain the digital item 162 in the virtual environment 130.

Figure 4A:
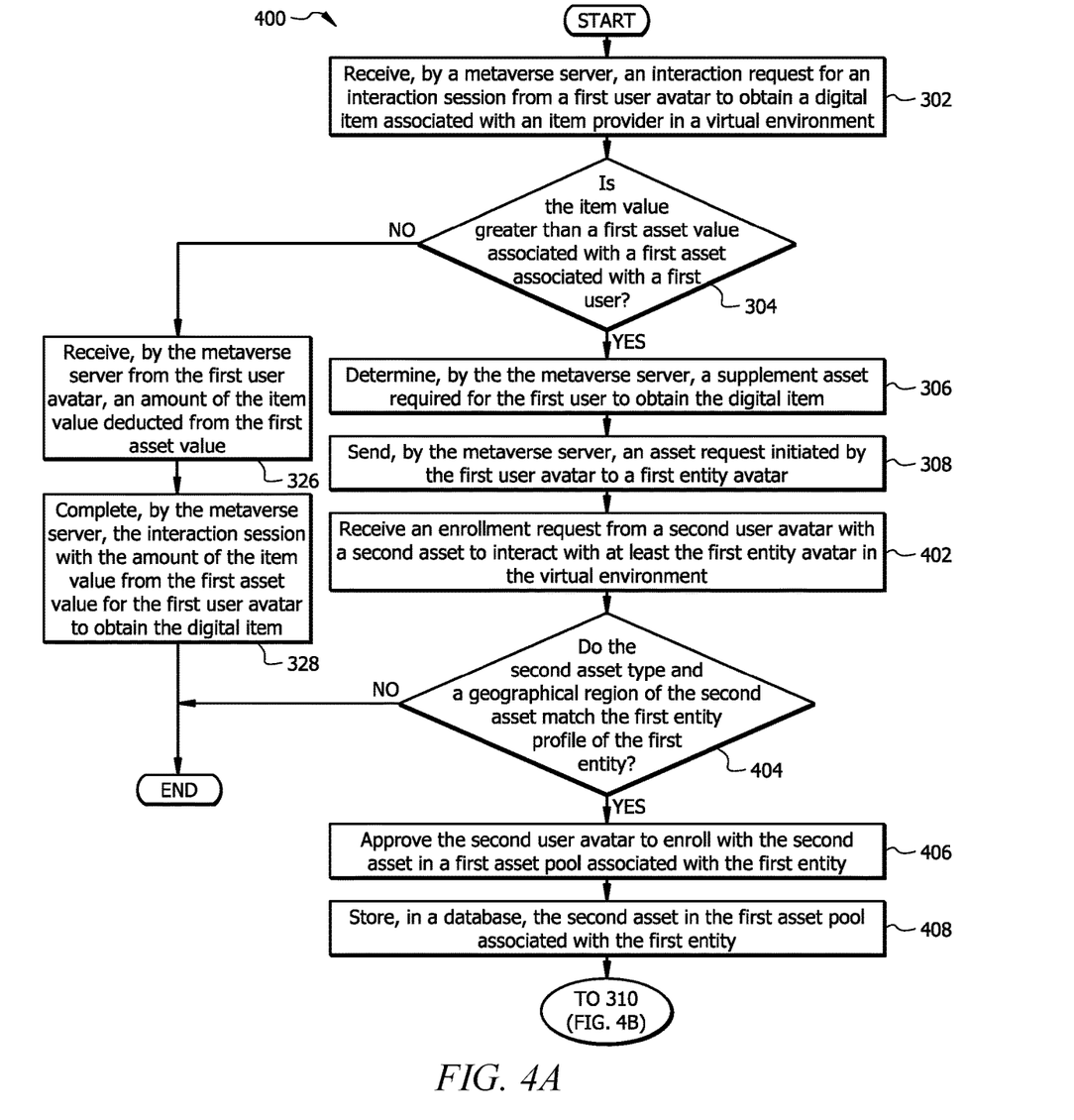
FIGS. 4A-4B illustrate an example operational flow of a method for creating multiple asset pools to complete an interaction session to obtain a digital item in the virtual environment.
Figure 4B:
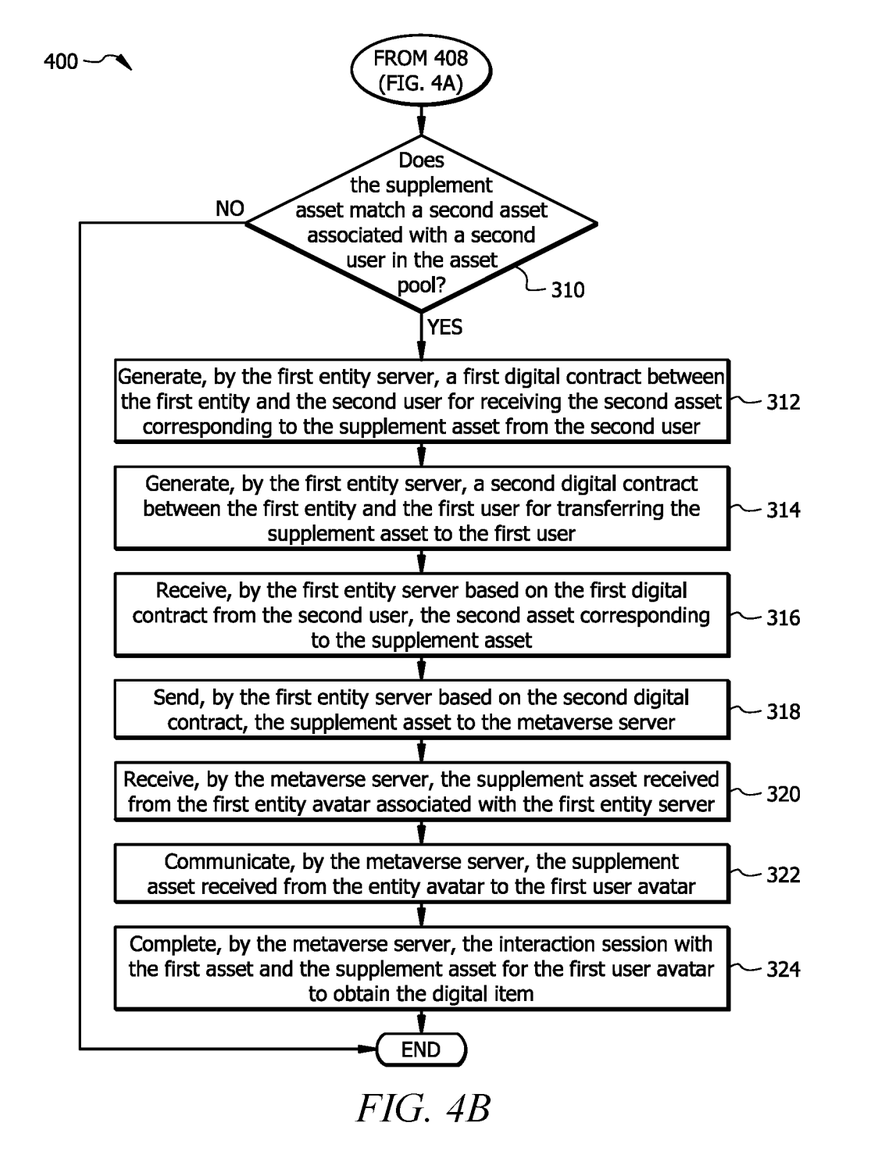

Example Operational Flow for Operations of Creating Multiple Asset Pools to Implement an Interaction Session to Obtain a Digital Item in a Virtual Environment FIGS. 4A-4B provide an example operational flow of a method 400 of creating multiple asset pools to implement an interaction session to obtain a digital item 162 in a virtual environment 130. Modifications, additions, or omissions may be made to method 400. Method 400 may include more, fewer, or other operations may be performed by the metaverse server 104 and the first entity server 170[1] in parallel or in any suitable order. While at times discussed as the system 100, processor 108, processor 172, virtual interaction engine 110, information security software instructions 116, software instructions 175, or components of any of thereof performing operations, any suitable system or components of the system 100 may perform one or more operations of the method 400. For example, one or more operations of method 400 may be implemented, at least by metaverse server 104 and the first entity server 170[1] to perform operations 302-308, 402-408, and 310-328.

At operation 302, the metaverse server 104 may receive an interaction request 144 for an interaction session from a first user avatar 132[1] to obtain a digital item 162 associated with an item provider in a virtual environment 130. The digital item 162 includes an item value 163 with the first asset type 138. The metaverse server 104 stores in a memory a first asset 136 associated with a first user 101[1]. The first asset 136 may include a first asset value 137 with a first asset type 138.

At operation 304, the metaverse server 104 determines whether the item value 163 is greater than the first asset value 137. At operation 326, in response to determining that the item value 163 is not greater than the first asset value 137, the metaverse server 104 may receive an amount of the item value 163 which is deducted from the first asset value 137 of the first asset 136 associated with the first user 101[1]. For example, the first user avatar 132[1] may request the metaverse server 104 to deduct the amount of the item value 163 from the first asset value 137 of the first asset 136. At operation 328, the metaverse server 104 may complete the interaction session with the amount of the item value 163 from the first asset 136 for the user avatar 132 to obtain the digital item 162 in the virtual environment 130.

At operation 306, in response to determining that the item value 163 is greater than the first asset value 137, the metaverse server 104 determines a supplement asset 164 required for the first user 101[1] to obtain the digital item 162. The supplement asset 164 represents a difference between the item value 163 and the first asset value 137 with the first asset type 138.

At operation 308, the metaverse server 104 sends an asset request 146 initiated by the first user avatar 132[1] to a first entity avatar 171[1]. The first entity avatar 171[1] is associated with the first entity server 170[1] associated with a first entity. The asset request 146 includes the supplement asset 164 which includes the supplement value 165 with the first asset type 138. The first entity server 170[1] receives the asset request 146 with the supplement asset 164.

At operation 402, the metaverse server 104 receives an enrollment request 194 from a second user avatar 132[2] with a second asset 140 to interact with at least the first entity avatar 171[1] in a virtual environment 130. the second user avatar 132[2] is associated with a second user 101[2]. The second asset 140 comprises a second asset value 141, a second asset type 142 and a geographical region.

At operation 404, the metaverse server 104 determines whether the second asset type 142 and a geographical region of the second asset 140 match a first entity profile 168[1] of the first entity. The first entity profile 168[1] includes one or more asset types and an entity geographical region where the first entity is located.

At operation 406, in response to determining that the second asset type 142 and the geographical region of the second asset 140 match the first entity profile 168[1], the metaverse server 104 approves the second user avatar 132[2] to enroll with the second asset 140 in a first asset pool 192[1] associated with the first entity.

At operation 408, the metaverse server 104 stores the second asset 140 in the first asset pool 192[1] associated with the first entity in a database 190.

At operation 310, the first entity server 170[1] queries a database 190 based on the asset request 146 to determine whether the supplement asset 164 matches a second asset 140 associated with a second user 101[2] in a first asset pool 192[1]. The database 190 stores the first asset pool 192[1] with one or more assets registered with the first entity.

At operation 312, in response to determining that the supplement asset 164 matches the second asset 140, the first entity server 170[1] generates a first digital contract 184[1] between the entity and the second user 101[2] for receiving the second asset 140 corresponding to the supplement asset 164 from the second user 101[2].

At operation 314, the first entity server 170[1] generates a second digital contract 184[2] between the first entity and the first user 101[1] for communicating the supplement asset 164 to the first user 101[1].

At operation 316, the first entity server 170[1] receives the second asset 140 corresponding to the supplement asset 164 based on the first digital contract 184[1] from the second user.

At operation 318, the first entity server 170[1] sends the supplement asset 164 to the metaverse server 104 based on the second digital contract 184[2].

At operation 320, the metaverse server 104 receives the supplement asset 164 from the entity avatar 171 associated with the first entity server 170[1].

At operation 322, the metaverse server 104 communicates the supplement asset 164 received from the first entity avatar 171[1] to the first user avatar 132[1].

At operation 324, the metaverse server 104 completes the interaction session with a combination of the first asset 136 and the supplement asset 164 for the user avatar to obtain the digital item 162 in the virtual environment 130.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. One or more non-transitory computer readable mediums storing one or more sets of instructions that, when executed, perform operations comprising:
   storing in a memory of a metaverse server a first asset associated with a first user, the first asset comprising a first asset value with a first asset type;
   generating, by a virtual interaction engine of the metaverse server, a first user avatar in a virtual environment;
   associating, by the virtual interaction engine of the metaverse server, the first user avatar with a first user device of the first user;
   receiving, by a processor of the metaverse server, an interaction request for an interaction session from the first user avatar to obtain a digital item associated with an item provider in the virtual environment, wherein the digital item comprises an item value with the first asset type;
   determining, by the processor of the metaverse server, whether the item value is greater than the first asset value;
   in response to determining that the item value is greater than the first asset value, determining, by the processor of the metaverse server, a supplement asset required for the first user to obtain the digital item, wherein the supplement asset represents a difference between the item value and the first asset value with the first asset type;
   sending, by the processor of the metaverse server, an asset request initiated by the first user avatar to a first entity avatar, wherein the first entity avatar is associated with a first entity server of a first entity, wherein the asset request includes data of the supplement asset comprising a supplement value with the first asset type;
   receiving, by the processor of the metaverse server, the supplement asset from the entity avatar associated with the first entity server;
   communicating, by the processor of the metaverse server, the supplement asset from the entity avatar to the first user avatar;
   completing, by the processor of the metaverse server, the interaction session with a combination of the first asset and the supplement asset for the first user avatar to obtain the digital item;
   querying by a processor of a first entity server, based on the asset request, a database to determine whether the supplement asset matches a second asset associated with a second user in a first asset pool, wherein the database stores the first asset pool with one or more assets registered with the entity;
   in response to determining that the supplement asset matches the second asset:
      generating, by the processor of the first entity server, a first digital contract between the entity and the second user for receiving the second asset corresponding to the supplement asset from the second user;
      generating, by the processor of the first entity server, a second digital contract between the entity and the first user for communicating the supplement asset to the first user;
   receiving, by the processor of the metaverse server, based on the first digital contract from the second user, the second asset corresponding to the supplement asset; and
   sending, by the processor of the metaverse server, based on the second digital contract, the supplement asset to metaverse server.

2. The one or more non-transitory computer readable mediums of claim 1, wherein the second asset has a second asset value with a second asset type, and further comprising determining, by the processor of the first entity server, whether the second asset type associated with the second asset is the same as the first asset type associated with the supplement value.

3. The one or more non-transitory computer readable mediums of claim 2, further comprising:
   in response to determining that the second asset type associated with the second asset is not the same as the first asset type associated with the supplement value,
   converting, by the processor of the first entity server, the second asset value with the second asset type to a converted asset value with the first asset type; and
   determining, by the processor of the first entity server, whether the supplement value with the first asset type matches the converted asset value with the first asset type.

4. The one or more non-transitory computer readable mediums of claim 3, further comprising:
- in response to determining that the supplement value with the first asset type matches the converted asset value with the first asset type,
- generating, by the processor of the first entity server, a first digital contract between the entity and the second user for receiving the second asset corresponding to the supplement asset from the second user; and
- generating, by the processor of the first entity server, a second digital contract between the entity and the first user for communicating the supplement asset to the first user.

5. The one or more non-transitory computer readable mediums of claim 1, further comprising receiving, by the processor of the first entity server, an enrollment request to interact with the entity avatar from a second user avatar associated with the second user to enroll in the first asset pool, wherein the enrollment request comprises the second asset with a second asset value and a second asset type.

6. The one or more non-transitory computer readable mediums of claim 5, further comprising
- determining, by the processor of the first entity server, whether the second asset type satisfies one of asset types required by the entity;
- in response to determining that the second asset type satisfies one of the asset types required by the entity, sending, by the processor of the first entity server, an approval via the entity avatar to the second user avatar to enroll the second user with the second asset into the first asset pool; and
- storing, by the processor of the first entity server, the second asset in the first asset pool stored in a database.

7. The one or more non-transitory computer readable mediums system of claim 1, further comprising:
- generating, by the processor of the first entity server, blockchain data associated with the second asset based on the first digital contract and the second digital contract; and
- updating, by the processor of the first entity server, the blockchain data based on one or more executions of the first digital contract and the second digital contract.

8. A method comprising:
- generating, by a virtual interaction engine implemented by a processor of a metaverse server, a first user avatar in a virtual environment;
- associating, by the virtual interaction engine of the metaverse server, the first user avatar with a first user device of a first user;
- receiving, by the metaverse server, an interaction request for an interaction session from the first user avatar to obtain a digital item associated with an item provider in the virtual environment, wherein:
  - the metaverse server stores in a memory a first asset associated with a first user, the first asset comprising a first asset value with a first asset type;
  - the digital item comprises an item value with the first asset type; and
  - the first user avatar is associated with a first user device associated with the first user;
- determining, by the metaverse server, whether the item value is greater than the first asset value;
- in response to determining that the item value is greater than the first asset value, determining, by the metaverse server, a supplement asset required for the first user to obtain the digital item, wherein the supplement asset represents a difference between the item value and the first asset value with the first asset type;
- sending, by the metaverse server, an asset request initiated by the first user avatar to an entity avatar, wherein the entity avatar is associated with a first entity server associated with a first entity, wherein the asset request includes data of the supplement asset comprising a supplement value with the first asset type;
- querying, by the first entity server based on the asset request, a database to determine whether the supplement asset matches a second asset associated with a second user in a first asset pool, wherein the database stores the first asset pool with one or more assets registered with the entity;
- in response to determining that the supplement asset matches the second asset:
  - generating by the first entity server, a first digital contract between the entity and the second user for receiving the second asset corresponding to the supplement asset from the second user; and
  - generating, by the first entity server, a second digital contract between the entity and the first user for communicating the supplement asset to the first user;
- receiving, by the first entity server based on the first digital contract from the second user, the second asset corresponding to the supplement asset; and
- sending, by the first entity server based on the second digital contract, the supplement asset to the metaverse server;
- receiving, by the metaverse server, the supplement asset from the first entity avatar associated with the first entity server;
- communicating, by the metaverse server, the supplement asset received from the entity avatar to the first user avatar; and
- completing, by the metaverse server, the interaction session with a combination of the first asset and the supplement asset to obtain the digital item for the user avatar.

9. The method of claim 8, wherein the second asset has a second asset value with a second asset type, and wherein the processor of the first entity server is further configured to determine whether the second asset type associated with the second asset is the same as the first asset type associated with the supplement value.

10. The method of claim 9, further comprising:
- by the first entity server,
- in response to determining that the second asset type associated with the second asset is not the same as the first asset type associated with the supplement value, converting the second asset value with the second asset type to a converted asset value with the first asset type; and
- determining whether the supplement value with the first asset type matches the converted asset value with the first asset type.

11. The method of claim 9, further comprising:
- by the first entity server,
- in response to determining that the supplement value with the first asset type matches the converted asset value with the first asset type,
  - generating a first digital contract between the entity and the second user for receiving the second asset corresponding to the supplement asset from the second user; and generating a second digital contract between the entity and the first user for communicating the supplement asset to the first user.

12. The method of claim 8, further comprising, by the metaverse server, receiving an enrollment request to interact with the entity avatar from a second user avatar associated with the second user to enroll in the first asset pool, wherein the enrollment request comprises the second asset with a second asset value and a second asset type.

13. The method of claim 12, further comprising:
by the first entity server,
determining whether the second asset type satisfies one of asset types required by the entity;
in response to determining that the second asset type satisfies one of the asset types required by the entity, sending an approval via the entity avatar to the second user avatar to enroll the second user with the second asset into the first asset pool; and
storing the second asset in the first asset pool stored in a database.

14. The method of claim 8, further comprising:
by the first entity server,
generating blockchain data associated with the second asset based on the first digital contract and the second digital contract; and
updating the blockchain data based on one or more executions of the first digital contract and the second digital contract.

15. A method comprising:
generating, by a virtual interaction engine implemented by a processor of a metaverse server, a first user avatar in a virtual environment;
associating, by the virtual interaction engine of the metaverse server, the first user avatar with a first user device of a first user;
receiving, by the metaverse server, an interaction request for an interaction session from the first user avatar to obtain a digital item associated with an item provider in the virtual environment, wherein:
the metaverse server stores in a memory a first asset associated with a first user, the first asset comprising a first asset value with a first asset type;
the digital item comprises an item value with the first asset type; and
the first user avatar is associated with a first user device associated with the first user;
determining, by the metaverse server, that the item value is greater than the first asset value;
determining, by the metaverse server, a supplement asset required for the first user to obtain the digital item, wherein the supplement asset represents a difference between the item value and the first asset value with the first asset type;
sending, by the metaverse server, an asset request initiated by the first user avatar to a first entity avatar, wherein the first entity avatar is associated with a first entity server associated with an entity, wherein the asset request includes data of the supplement asset comprising a supplement value with the first asset type;
querying, by the first entity server based on the asset request, a database to determine that the supplement asset matches a second asset associated with a second user in a first asset pool, wherein the database stores the first asset pool with one or more assets registered with the entity;

generating by the first entity server, a first digital contract between the entity and the second user for receiving the second asset corresponding to the supplement asset from the second user; and
generating, by the first entity server, a second digital contract between the entity and the first user for communicating the supplement asset to the first user;
receiving, by the first entity server based on the first digital contract from the second user, the second asset corresponding to the supplement asset;
sending, by the first entity server based on the second digital contract, the supplement asset to the metaverse server; and
completing, by the metaverse server, the interaction session with a combination of the first asset and the supplement asset to obtain the digital item for the user avatar.

16. The method of claim 15, wherein the second asset has a second asset value with a second asset type, and wherein the processor of the first entity server is further configured to determine whether the second asset type associated with the second asset is the same as the first asset type associated with the supplement value.

17. The method of claim 15, further comprising:
by the first entity server,
in response to determining that the second asset type associated with the second asset is not the same as the first asset type associated with the supplement value, converting the second asset value with the second asset type to a converted asset value with the first asset type; and
determining whether the supplement value with the first asset type matches the converted asset value with the first asset type.

18. The method of claim 15, further comprising:
by the first entity server,
in response to determining that the supplement value with the first asset type matches the converted asset value with the first asset type;
generating a first digital contract between the entity and the second user for receiving the second asset corresponding to the supplement asset from the second user; and
generating a second digital contract between the entity and the first user for communicating the supplement asset to the first user.

19. The method of claim 15, further comprising, by the metaverse server, receiving an enrollment request to interact with the entity avatar from a second user avatar associated with the second user to enroll in the first asset pool, wherein the enrollment request comprises the second asset with a second asset value and a second asset type.

20. The method of claim 19, further comprising:
by the first entity server,
determining whether the second asset type satisfies one of the asset types required by the entity;
in response to determining that the second asset type satisfies one of the asset types required by the entity, sending an approval via the entity avatar to the second user avatar to enroll the second user with the second asset into the first asset pool;
storing the second asset in the first asset pool stored in a database;
generating blockchain data associated with the second asset based on the first digital contract and the second digital contract; and updating the blockchain data based on one or more executions of the first digital contract and the second digital contract.

\* \* \* \* \*